United States Patent [19]

Bechtel et al.

[11] Patent Number: 5,751,696
[45] Date of Patent: May 12, 1998

[54] MULTIPLEXED-COMMUNICATIONS NETWORK HAVING MIXED PROTECTION AGAINST FAULTS AND ERRORS

[75] Inventors: Gordon L. Bechtel, Newburyport; Curtis J. Newton, Medford, both of Mass.

[73] Assignee: Lucent Technologies Inc., Murray Hill, N.J.

[21] Appl. No.: 581,792

[22] Filed: Jan. 2, 1996

[51] Int. Cl.[6] .................................................. H04L 1/00
[52] U.S. Cl. ........................................ 370/223; 370/224
[58] Field of Search ................................. 370/217–226; 359/110, 119

[56] References Cited

U.S. PATENT DOCUMENTS

| | | |
|---|---|---|
| 4,633,246 | 12/1986 | Jones et al. .......................... 370/224 |
| 4,835,763 | 5/1989 | Lau ..................................... 370/16 |
| 5,191,579 | 3/1993 | Matsushita et al. ................ 370/224 |
| 5,317,198 | 5/1994 | Husbands .......................... 370/222 |

OTHER PUBLICATIONS

R. Ballart—Y.C. Ching *IEEE Communications Magazine*, vol. 27, No. 3, Mar. 1989 "SONET: Now It's the Standard Optical Network" pp. 8–15.

*Primary Examiner*—Melvin Marcelo

[57] ABSTRACT

A dual-ring, multiplexed-communications network to deliver protected service to nodes where protection is required, while simultaneously other nodes of the same network, where only unprotected commodity service is needed, are not burdened with the cost of duplicated optical and electronic equipment.

11 Claims, 4 Drawing Sheets

A MIXED-PROTECTION NETWORK

FIG. 1
A MIXED-PROTECTION NETWORK

FIG. 2
SONET/SDH STANDARD RDI/AIS SIGNALING
PRIOR ART

FIG. 3
RDI-L PASS-THROUGH

1

MULTIPLEXED-COMMUNICATIONS NETWORK HAVING MIXED PROTECTION AGAINST FAULTS AND ERRORS

BACKGROUND OF THE INVENTION

1. Field of the Invention

This invention relates to a ring network of interconnected nodes which is adapted to deliver protected service to those nodes which require protection, while simultaneously delivering less-expensive unprotected service to the nodes of the network which do not require protection. The invention is especially suited for use in fiber-optic networks in which each node includes at least one receiver-transmitter pair requiring lasers and suitable optical-electronics detection equipment, which are expensive.

In the communications-distribution networks of today, the nonessential services, which cannot cost-justify protection against errors, can function with equipment infrastructures that are much simpler than those required by premium services, for which protection against error or fault can be cost-justified. For instance, "plain old telephone service" ("POTS") and "DS0" data transmission can function without protected facilities, whereas "DS1's" may be offered as a premium service requiring duplicated fiber facilities and optical equipment. So long as the nonessential services were geographically separated from the premium services, this diversity of requirement for equipment did not necessarily raise a problem-protected facilities were furnished to the geographical area requiring premium services, whereas less-expensive unprotected facilities were furnished to the area in which nonessential services sufficed.

Now, however, the evolution of multi-media service and the changing work environment, e.g., "telecommuting," are leading to a requirement for the availability of both nonessential and premium services in the same geographical area. Customers requiring premium services must be willing to pay for them, while customers needing only nonessential services should not be "taxed" for the protection that they do not require. Of course, the service provider could install separate overlay networks, one for protected service and the other for unprotected service. However, overlay networks can make very inefficient use of equipment and facilities and require high levels of investment for their installation and maintenance. It would be desirable to have a dual-purpose network in which the burden of expense of certain common equipment could be shared between the nonessential customers and the premium customers, and in which the cost of protection would be paid only by the premium customers, who need it.

2. Description of the Prior Art

In the development of ring networks for communications systems, much attention has been devoted to the continuity of communication despite a break in a link between adjacent nodes of the network or a failure of one of the nodes. With special applicability to networks of optical fiber, provision has been made for a dual ring in which a first ring transports communications in a first direction around the ring, while the second ring transports identical and redundant communications in the opposite direction. The redundancy supplies protection against a fault in one, or even both of the rings. For instance, reference is made to U.S. Pat. No. 4,835,763-Lau, issued on May 30, 1989. The patent to Lau is concerned with protection against faults in a dual ring, even when continuity between an adjacent pair of nodes is simultaneously cut in both rings of the network. But Lau does not address the economically-important objective of providing a single network in which customers requiring premium, protected service will receive it, while customers not needing or being willing to pay for protected service will have access to the links between nodes of the network but will not be charged with the full expense of maintaining a protected node.

SUMMARY OF THE INVENTION

Briefly, our invention allows a single multiplexed-communications network to deliver protected service to nodes where protection is required, while simultaneously delivering unprotected nonessential service to other nodes which do not need protection and do not want the added expense of duplicated optical and electronic equipment. The network consists of two counterrotating rings, designated "ring 1" and "ring 2." Nodes which require full protection connect to both rings. Nodes which do not require protection connect to either ring 1 or ring 2, but not both. Nodes which deliver only nonessential service are connected to a single ring and are denoted as "basic" nodes. Nodes which deliver only premium services are connected to both rings and are denoted as "premier" nodes. Nodes which deliver a mixture of nonessential and premium services are connected to both rings and are denoted as "mixed" nodes. The network carries payload information, in the form of subrate channels, as well as overhead signals indicating faults in facility or equipment. All nodes in the network have the capability to multiplex ("add"), demultiplex ("drop") and "pass-through" subrate channels and overhead signals. All nodes in which facility protection is required are connected to both ring 1 and ring 2, and incorporate at least a receiver-transmitter pair for each of these connections. Furthermore, protection is accomplished, at each node connected to both rings, by means of a two-to-one selector which monitors the status of the respective inputs to the receivers of the node and selects the better of the two. If there is a fault in the ring, or an error in the subrate channels from one of the rings, only the "better" set of demultiplexed subrate channels will be furnished to the interface between the node and other equipment for further processing.

The invention is intended to build on and interwork with existing standards for communications, such as "SONET" and "SDH," which assume a bidirectional transmission path between adjacent nodes in determining what maintenance signals are appropriate and necessary. However, our basic nodes connect to only one ring, so they have only a unidirectional transmission path to adjacent nodes; SONET's assumption of a "bidirectional path to adjacent nodes" is violated. Thus, the mixed-protection network architecture of this invention requires basic nodes to provide some new maintenance-signaling functions that permit mixed and premier nodes to operate using standard maintenance-signaling functions.

BRIEF DESCRIPTION OF THE DRAWINGS

The invention summarized above will be described in detail in the following specification. The specification will be best understood if read while referring to the accompanying drawings, in which:

3

FIGS. 3 and 4 primarily illustrate the new maintenance-signaling functions required of the basic node. FIG. 3 stresses the ability of the basic node to "pass through" the "line remote-defect indicator," an important type of trouble signal.

DETAILED DESCRIPTION OF THE PREFERRED MODE OF CARRYING OUT THIS INVENTION

Figure 1:
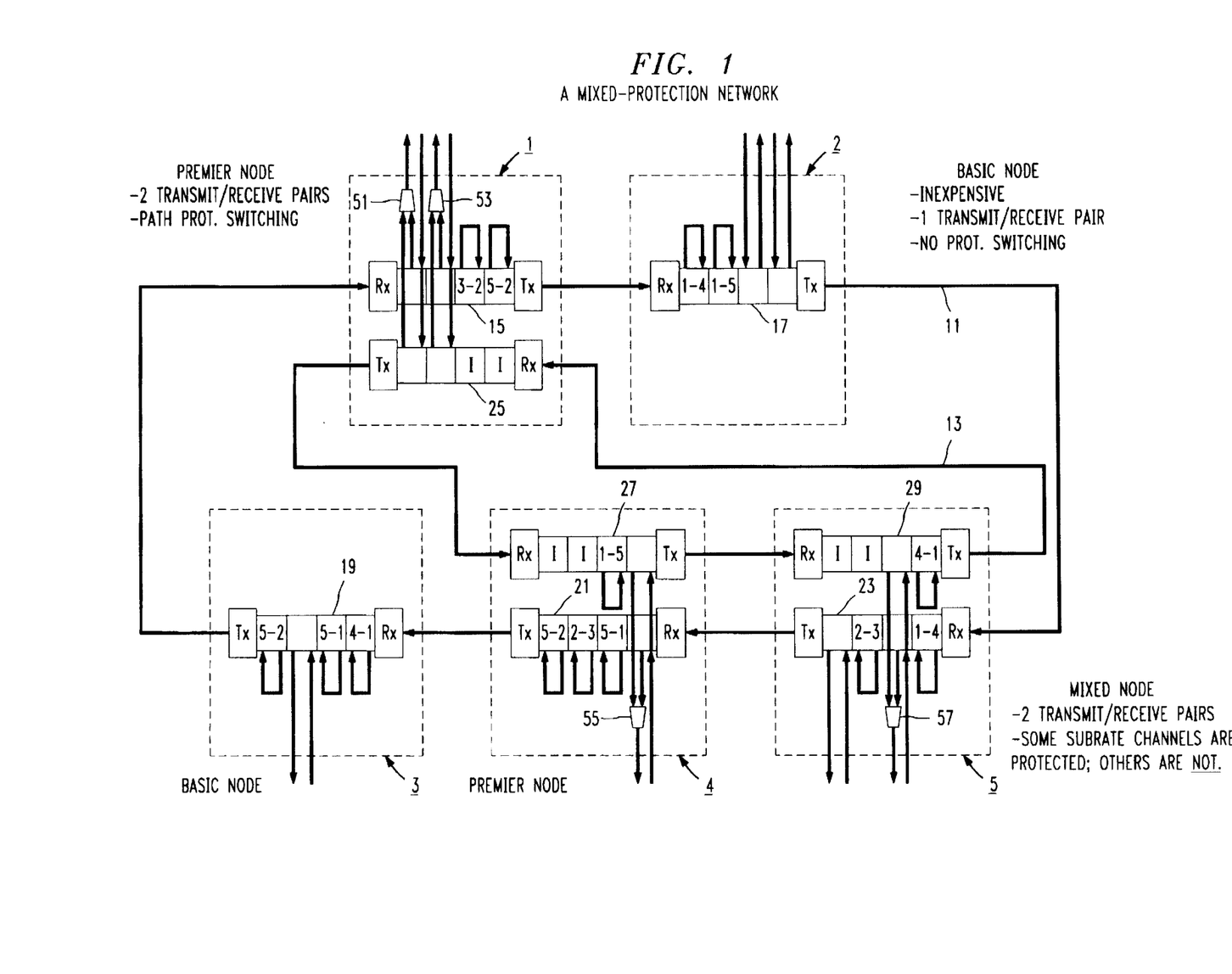
FIG. 1 is a schematic diagram of an exemplary mixed-protection dual-ring network, which could be fiber or otherwise, and in which there are five nodes, all connected in the clockwise ring, "ring 1." Three of the nodes are also connected in the counterclockwise ring, "ring 2"

Turning to FIG. 1 of the drawings, nodes 1, 2, 3, 4, and 5 are connected in tandem by a clockwise ring 11. Nodes 1, 4, and 5 are also connected in tandem by a counterclockwise ring 13. Nodes 1–5 are drawn from three different sets, each set representing a particular intra-node configuration and also giving an indication of (1) whether the particular node delivers only unprotected services and is connected only to a single ring (11 or 13); or (2) delivers only protected service and is connected to both clockwise ring 11 and counterclockwise ring 13; or (3) delivers a mixture of unprotected and protected service and is connected to both clockwise ring 11 and counterclockwise ring 13. For the purposes of explanation, these three sets of nodes may be designated respectively as "basic nodes," "premier nodes," and "mixed nodes." Thus, for the purpose of illustration, node 1 becomes "premier node 1"; node 2 becomes "basic node 2"; node 3 becomes "basic node 3"; node 4 becomes "premier node 4"; and node 5 becomes "mixed node 5." In the network according to our invention, the number of nodes drawn from each of the 3 sets is not prescribed or limited, except that there must be at least one non-premier node (basic or mixed). Furthermore, the sequence of types of node drawn from the respective three sets is not limited in the practice of our invention.

In FIG. 1, clockwise ring 11, to which all five of the illustrated nodes are connected, is illustrated with generic multiplexed-communications links between adjacent pairs of nodes. Likewise, counterclockwise ring 13 is illustrated with generic multiplexed-communications links between adjacent pairs of nodes. The principles of our invention might be employed in any dual-ring communications network, including one composed of fiber-optic gear. Our invention is, in fact, especially well-suited for adoption and practice in the fiber-optic communications industry, which is becoming ever more important. In such a case, the generic multiplexed-communications links would be replaced with fiber-optic links.

Each node contains at least one "controller." A controller performs all the necessary data processing to interface properly to a single ring. Its functionality includes the ability to receive data from the ring, the ability to demultiplex and multiplex data from and to the ring, and the ability to transmit data onto the ring. Premier node 1 contains a first controller 15; basic node 2 contains a second controller 17; basic node 3 contains a third controller 19; premier node 4 contains a fourth controller 21; and mixed node 5 contains a fifth controller 23. In addition, premier node 1 contains a sixth controller 25; premier node 4 contains a seventh controller 27; and mixed node 5 contains an eighth controller 29. Controllers 15 through 23 are connected to clockwise ring 11, whereas controllers 25 through 29 are connected to counterclockwise ring 13.

Figure 3:
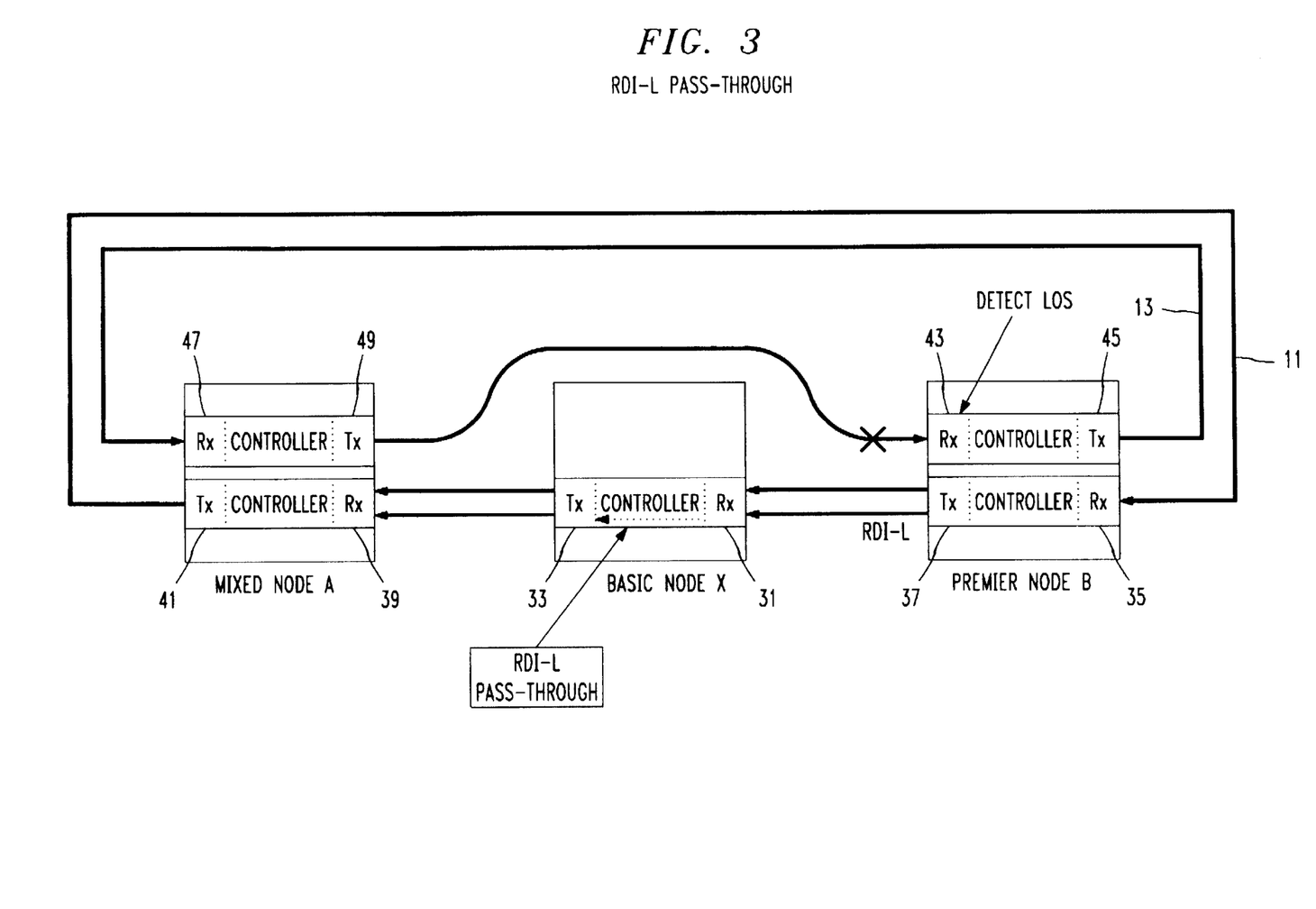
FIG. 3 is a schematic diagram of a dual-ring network having three distinct types of nodes connected to ring 1, two of which are also connected to ring 2. The figure highlights the difference in number of receiver-transmitter pairs included in the three respective types of node.
Figure 4:
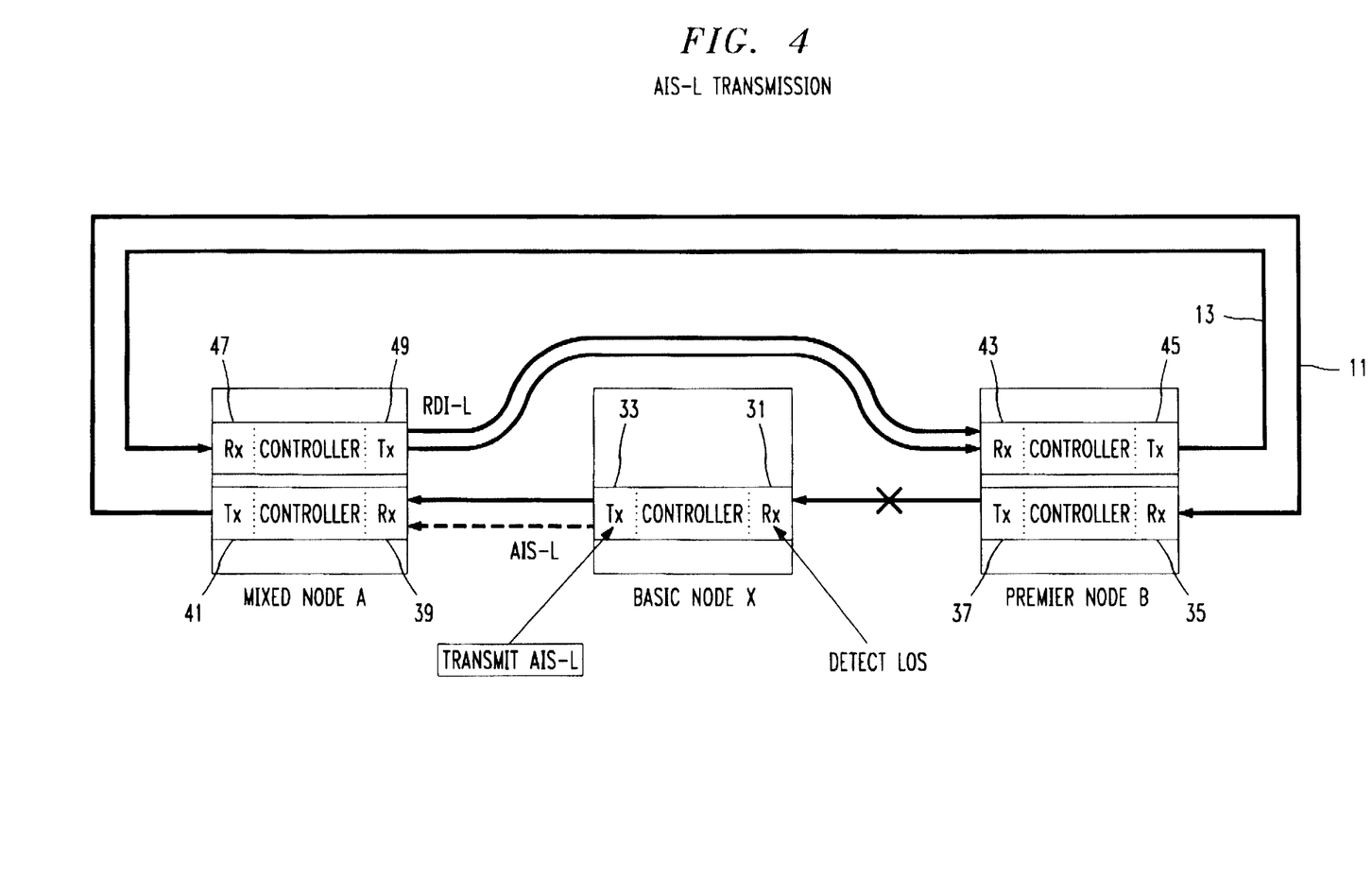
FIG. 4 is again a schematic diagram of a dual-ring network connected similarly to the network of FIG. 3, but highlighting the necessary ability of the basic node to transmit a downstream warning of a fault in a ring, upstream from the node detecting the fault, by means of a "line alarm-indication signal."

FIG. 3 and FIG. 4 of the drawings illustrate the essential and most important components of the controllers of the three respective types of node drawn from the set of basic nodes, the set of premier nodes, and the set of mixed nodes. Since only one node from each such set is illustrated in FIG. 3 and FIG. 4, in contradistinction to the representation of FIG. 1, which shows 2 basic nodes and 2 premier nodes, the designations of the nodes in FIG. 3 and FIG. 4 are "Basic Node X," "Premier Node B," and "Mixed Node A." The essential and most important components of the controller of Basic Node X are a first receiver 31 and a first transmitter 33, both of which are connected in series with clockwise ring 11. The "payload" (substantive information) and the "overhead" (maintenance signals) transported on clockwise ring 11 are received by first receiver 31, and are re-transmitted on clockwise ring 11 by first transmitter 33. Basic Node X also has the capability (not illustrated in FIG. 3 or FIG. 4) to "drop" subrate channels derived from the payload of the information transported on clockwise ring 11 and received by first receiver 31. Assuming, for the purposes of illustration, that the payload transported on clockwise ring 11 is a multiplexed digital signal, the "dropping" function performed by Basic Node X, and other nodes drawn from the set of basic nodes, would comprise demultiplexing the subrate channel destined for Basic Node X and delivering it through a suitable interface to utilization equipment not shown in any of the figures of the drawings. Similarly, Basic Node X and other basic nodes drawn from the same set have the capability to "add" subrate channels to the payload transported on clockwise ring 11 by multiplexing them onto clockwise ring 11 by means of suitable timing and control which are well understood in the art. Although the "dropping" step performed by Basic Node X is not illustrated in FIG. 3 or FIG. 4 of the drawings, both the dropping and adding steps are illustrated in the representation of Basic Node 2 and Basic Node 3 in FIG. 1 of the drawings. Once again, Basic Node 2 and Basic Node 3 and Basic Node X are all drawn from the same set. The characteristic of that set is that it can function with only one receiver-transmitter pair.

Turning now to Premier Node B of FIG. 3 and FIG. 4, we note the correspondence between Premier Node B of FIG. 3 and FIG. 4, on the one hand, and Premier Node 1 and Premier Node 4 of FIG. 1 on the other hand. Premier Node 1 and Premier Node 4 each have two controllers. Similarly, Premier Node B has two receiver-transmitter pairs. One receiver-transmitter pair is connected in tandem with clockwise ring 11, transporting information and signals in a clockwise direction in FIG. 3 and FIG. 4. The other receiver-transmitter pair is connected in tandem with counterclockwise ring 13, which has an indicated counter-clockwise direction of propagation in each of FIG. 1, FIG. 3 and FIG. 4.

In FIG. 1, counterclockwise ring 13 bypasses Basic Node 2 and Basic Node 3, but is connected in series with Premier Node 1, Premier Node 4 and Mixed Node 5. In doing so, it passes through sixth controller 25, seventh controller 27, and eighth controller 29. In FIG. 3 and FIG. 4, counterclockwise ring 13 bypasses Basic Node X, but is connected in series with a fourth receiver 43 and a fourth transmitter 45 of Premier Node B, and a fifth receiver 47 and fifth transmitter 49 of Mixed Node A. Comparing the representation of FIG. 3 and FIG. 4 with FIG. 1 of the drawings, fourth receiver 43 and fourth transmitter 45 would together correspond to sixth controller 25 of Premier Node 1 and to seventh controller 27 of Premier Node 4, as represented in FIG. 1 of the drawings.

Fifth receiver 47 and fifth transmitter 49 of Mixed Node A in FIG. 3 and FIG. 4 would correspond to eighth controller 29 of Mixed Node 5 in FIG. 1 of the drawings. Again, they are all connected in series with counterclockwise ring 13, which has an indicated counterclockwise direction of propagation in all three figures of the drawings.

Premier Nodes 1, 4, and B all have the capability to drop subrate channels from either or both of clockwise ring 11 and counterclockwise ring 13. Any of those premier nodes can demultiplex payload communication destined for that particular node and deliver it through a suitable interface to utilization equipment. However, Premier Nodes 1, 4, and B have a further capability which was not possessed by Basic Nodes 2, 3, or X. Supplementing its "controller," each of the premier nodes includes one or more "selectors" for sampling the overhead and payload information on both clockwise ring 11 and counterclockwise ring 13, and for selecting from those sources the subrate channels identified as having the higher level of integrity.

In the nodes drawn from the set of premier nodes, each subrate channel demultiplexed from the payload of the information transported on the ring to which the premier node is connected is associated, or paired, with a maintenance signal taken from the "overhead" portion of the information transported on the ring. This maintenance signal may be designated as an "integrity-data signal." The integrity-data signals associated with the respective demultiplexed subrate channels derived by receivers of the premier node from clockwise ring 11 and counterclockwise ring 13 are compared by, for instance, a first selector 51 and a second selector 53 in Premier Node 1, and a third selector 55 in Premier Node 4, as depicted in FIG. 1 of the drawings. In each case, the subrate channel associated with the more favorable integrity-data signal is selected to be "dropped" and furnished through an appropriate interface to the utilization equipment. Careful examination of Basic Node 2 and Basic Node 3, as shown in FIG. 1, reveals that those basic nodes do not incorporate any selector or selectors for comparing the integrity-data signals from respective rings and dropping only the subrate channel associated with the more favorable integrity-data signal. The reason is that each of Basic Node 2 and Basic Node 3 has only a single controller, which is connected in tandem with clockwise ring 11. Those nodes are not connected to counterclockwise ring 13, and, as to those nodes, no provision is made for a comparison of integrity-data signals. Although the integrity-data signals transported on clockwise ring 11 pass through Basic Node 2 and Basic Node 3, there is no parallel integrity-data signal available to the basic nodes, with which to compare them. This is the distinguishing feature of unprotected service, which is satisfactory for most non-essential purposes, but not for premium types of service. Once again, it is noteworthy that the multiplexed subrate channels transported respectively on clockwise ring 11 and counterclockwise ring 13 pass through Premier Node 1, Premier Node 4, and Premier Node B in opposite directions. Accordingly, the relative positions of the receiver-transmitter pairs, as illustrated in FIG. 3 and FIG. 4, are opposite for the two receiver-transmitter pairs.

Turning now to the depiction in FIG. 1 of Mixed Node 5 and the depiction in FIG. 3 and FIG. 4 of Mixed Node A, the illustrated configuration does not differ greatly from the illustrated configuration of the respective premier nodes which have just been described. In both cases, there are two receiver-transmitter pairs, connected in opposite directions to accommodate the opposite directions of transport on clockwise ring 11 and counterclockwise ring 13 respectively. If the multiplexed-communications network is adapted for the transmission of information and signals at optical frequencies over a pair of optical fibers, the receivers of each pair, one for each controller, will include detectors for signals of optical frequencies. Such detectors are well-known in the art and need not be described in detail in this specification. Similarly, assuming again a fiber-optic network, each transmitter of the pairs included in the respective controllers of the premier and mixed nodes will presumably include a laser or other suitable optical oscillator for generating and transmitting to the next node of the network the "carrier" onto which the subrate channels are multiplexed. The term "subrate channel" is used in its generic sense to designate a stream of information which is multiplexed onto one or both of the rings of the network at a particular node. It is then demultiplexed and, if suitable, "dropped" at another node to which the subrate channel is destined to be transported. Typically the multiplexing and demultiplexing operations are performed in the time domain. However, the multiplexing and demultiplexing operations could equally well be performed in any other domain, including the frequency domain or the code-division domain. Again, the details of multiplexing and demultiplexing in any domain are familiar in the art, and need not be discussed in detail in this specification.

The mode of operation of the mixed nodes does require some discussion at this point. Like Premier Node 1, Premier Node 4, and Premier Node B, Mixed Node 5 and Mixed Node A each contain two controllers. In this respect, they are unlike Basic Node 2, Basic Node 3, and Basic Node X, each of which has only one controller. Basic Nodes 2, 3, and X have no provision for "path-protection switching" of subrate channels depending on a comparison of integrity-data signals drawn from two rings of the network. By contrast, nodes drawn from the set of premier nodes and from the set of mixed nodes do have such provision. In the case of the premier nodes, path-protection switching is provided for all subrate channels demultiplexed at those nodes. In the case of the mixed nodes, path-protection switching is provided for only some of the subrate channels demultiplexed at those nodes. For other subrate channels carrying non-essential services and originating at a basic or another mixed node, no protection against error or fault is provided. For instance, referring to FIG. 1, a subrate channel originates at Basic Node 2, destined for Mixed Node 5. This channel travels only on the clockwise ring and is therefore unprotected. Neither Basic Node 2 nor Mixed Node 5 employs a 2:1 selector when dropping this subrate channel, and all other nodes pass the subrate channel through without modification. By contrast, another subrate channel originates at Premier Node 1 destined for Mixed Node 5. This subrate channel is carried on both clockwise ring 11 and counterclockwise ring 13 and is therefore fully-protected against equipment and facility failures. Both Premier Node 1 and Mixed Node 5 employ 2:1 selectors in order to offer fully-protected service. Note that all basic nodes have only a single controller structure and so do not incur the cost of replicated transmitters, multiplex/demultiplex circuitry or receivers. This is the primary source for savings in equipment cost. A secondary source of savings is the potential cost savings from not having to implement 2:1 selectors for every subrate channel dropped at a mixed node.

FIG. 1 shows only one "fourth selector 57," in Mixed Node 5, whereas Premier Node 1 has first selector 51 and second selector 53 as subcombinations thereof. It will be understood that the number of subrate channels to be protected, and the number of subrate channels to be left unprotected, will be a matter of engineering design. According to the principles of our invention, there will always be an available choice concerning the investment to be made in equipment and facilities. For nodes requiring no protection, non-essential service will be provided at an economical cost. On the other hand, for nodes requiring total protection, all subrate channels will be protected against fault in the system or error in transmission. Customers can expect to pay the cost of this premium service. For geographical areas in which there is a need for protected service coincident with a requirement by other nearby customers for economical service, mixed protection will be available. In the field of communications over fiber-optic lines, it would be possible to envisage a single household in which one member needs only "plain old telephone service" to communicate with his friends, whereas another member, a certified public accountant, requires protected service for communications with clients in order not to risk loss or contamination of valuable financial data which could not easily be reconstructed. In such a case, separate lines might be necessary for the two members of the same household. However, only one of them would be assessed for a share of the cost of a controller having a selector for comparing the respective integrity-data signals from two rings of the network.

The foregoing paragraphs have demonstrated the savings which can be made by drawing a node for a particular application from the set of "basic nodes" or "mixed nodes" rather that from the set of "premier nodes." The customers connected to each of the basic or mixed nodes, and deriving service therefrom, would have requirements differing from those of the customers connected to the premier nodes. The opportunity for savings of cost in the structure of the basic and mixed nodes has been made clear. However, in the communications industry, certain standards have been imposed that must be observed in order to insure compatibility with equipment which is already in place in the industry. For example, there is an implicit requirement for compliance with the standards of the so-called "synchronous optical network," originally proposed by Bell Communications Research Corporation ("BELLCORE") and later recommended by the American National Standards Institute for adoption throughout the industry. The standard proposed by BELLCORE and subsequently recommended by "ANSI" has been modified and extended to accommodate the requirements of the European and Japanese telecommunications industries. The result has been a combined and reconciled specification designated as "SONET/SDH." The pertinent portion of the "SONET/SDH" specification relates to "maintenance signals," the portion of the "overhead" transmission on the lines or rings relating to the integrity status of those lines or rings and also to the apparent integrity of the substantive information transported on those lines or rings.

According to domestic telephone usage, as recognized in the SONET/SDH specification, a distinction is made among the various "spans" which are inherent in a communications network. A "path" is the entire course of information and signals from user to user, from customer to customer. A "line" is the course of communications and signals between the respective transmitters and receivers of the users or customers at each end of the communications link. A "section" is typically the span between respective "repeater" elements of the users or customers, assuming that amplification or "boosting" of the signal enroute from transmitter to receiver is required. This is a very brief description of the traditional "layering" of facilities which has been adopted by participants in the communications industry.

Figure 2:
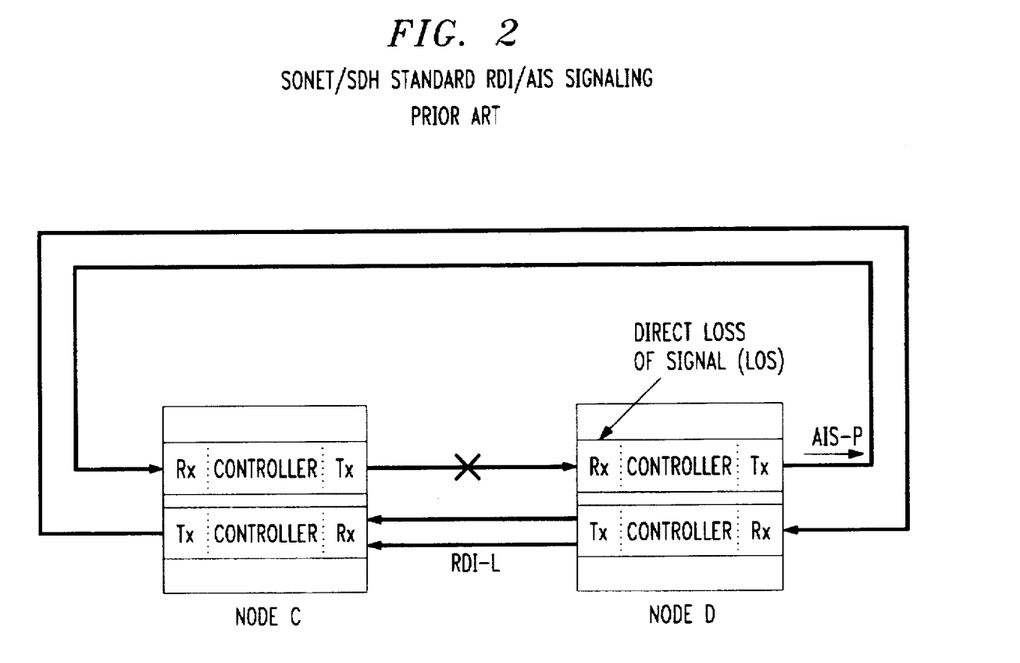
FIG. 2 is a schematic diagram of RDI/AIS SONET/SDH standard maintenance signaling in accordance with the prior art.

In order to "mesh" with the existing standards of the industry, we have found it desirable to include in our specification additional signaling criteria which are illustrated graphically in FIG. 3 and FIG. 4. These changes result from the fact that "basic" nodes violate the assumption that a bidirectional path always exists between adjacent line-terminating nodes. This assumption is demonstrated in FIG. 2, wherein adjacent line-terminated nodes are connected with a bidirectional link, in accordance with the SONET/SDH standard. To resolve this "violation," a basic node must be made to appear from a network-maintenance-signaling perspective as a section-terminating network element only, even though it actually does terminate line and path overhead in order to add and drop subrate channels. Appearing as a section-terminating element allows the line-level maintenance signals used by premier and mixed nodes to operate in accordance with the SONET/SDH standard.

The first situation wherein the maintenance signaling performed at a basic node must be modified is for the receipt of a "remote defect indicator" at the line level ("RDI-L"). This signal indicates to an upstream node, connected to both the clockwise ring and the counterclockwise ring, that a fault has been detected downstream. In order to satisfy the SONET/SDH specification at mixed and premier nodes, the remote-defect-indicator signal must be passed, without modification, through every basic node within the span of a "line." Thus, every node drawn from the set of basic nodes should have the capability to pass through a remote defect indicator at the line level. This attribute is illustrated graphically in FIG. 3 of the drawings. While simplifying the structure of the basic nodes to minimize cost, this "RDI-L" pass-through capability should be added so that the maintenance signaling of premier and mixed nodes can satisfy the existing SONET/SDH standards.

For similar reasons, a basic node must also pass through an alarm-indication signal at the line level ("AIS-L").

The second situation wherein maintenance signaling must change at a basic node in order to mesh with the standardized signaling at premier and mixed nodes is for the detection of Loss of Signal ("LOS") at a basic node. In this situation, a basic node must convey to the next-adjacent downstream node an indication of Loss of Signal from upstream. It does this by transmitting a line-level alarm-indication signal (AIS-L). Referring to FIG. 4 of the drawings, let us suppose that first receiver 31 detects a Loss of Signal on clockwise ring 11. Basic Node X should have the capability to transmit AIS-L to the adjacent downstream node (e.g., Mixed Node A in FIG. 4). This represents a change from the current SONET/SDH standards, which specify that an alarm-indication signal at the path level ("AIS-P") be inserted in such a situation. Fulfilling SONET/SDH standards, the next downstream mixed or premier node would then return RDI-L in the upstream direction upon receipt of AIS-L.

For similar reasons, a basic node must also generate AIS-L when presented with a Loss of Frame ("LOF").

The criteria for line-level signaling to which a basic node must adhere are summarized in the following table:

| If a basic node receives: | Then it must transmit: |
| --- | --- |
| LOS | AIS-L |
| LOF | AIS-L |
| AIS-L | AIS-L |
| RDI-L | RDI-L |

The basic architecture of the multiplexed-communications network in accordance with our invention is shown in FIG. 1 of the drawings. Two additional features which are important in making the network of our invention compatible with the SONET/SDH specification are illustrated in FIG. 3 and FIG. 4 respectively. All of the important principles of our invention have been fully disclosed. Minor modifications of the configuration may be made without departing from the scope of the invention. Accordingly, the invention is further defined in the following claims.

We claim:

1. A multiplexed-communications network comprising:

(a) a first ring adapted to transport multiplexed subrate channels and integrity-data signals around said first ring in a first direction, (b) a second ring associated with said first ring and adapted to transport multiplexed subrate channels and integrity-data signals around said second ring in a second direction which is opposite to said first direction, and (c) a plurality of nodes each of which is connected in series with at least one of said first ring and said second ring, each of said nodes having:

(1) at least one receiver-transmitter pair for receiving from said ring and transmitting on said ring said multiplexed subrate channels and integrity-data signals, (2) means for adding, by multiplexing, subrate channels and integrity-data signals onto said ring, (3) means for dropping, by demultiplexing, subrate channels and integrity-data signals from said ring, (4) means for passing through the node subrate channels and integrity-data signals from receiver to transmitter on said ring, and (5) means for delivering predetermined demultiplexed subrate channels to an interface between said network and utilization equipment, (d) each of said plurality of nodes being selected from:

(1) a first set of nodes each of which has one receiver-transmitter pair and is connected in series with only one of said first ring and said second ring, and which adds onto said one ring and drops from said one ring dissociated subrate channels and integrity-data signals, (2) a second set of nodes each of which has two receiver-transmitter pairs and is connected in series with each of said first ring and said second ring, and which adds onto both of said first ring and said second ring, and drops from both of said first ring and said second ring, associated pairs of subrate channels with integrity-data signals, and (3) a third set of nodes each of which has two receiver-transmitter pairs and is connected in series with each of said first ring and said second ring, and which adds onto both of said first ring and said second ring, and drops from both of said first ring and said second ring, a set of predetermined associated pairs of subrate channels with integrity-data signals, and which adds onto one ring, and drops from said one ring, a set of predetermined dissociated subrate channels and integrity-data signals.

2. A multiplexed-communications network in accordance with claim 1 in which each node of either said second set or said third set, upon receiving from either said first ring or said second ring a line-level loss-of-signal, loss-of-frame, or alarm-indication signal, generates and transmits on said first ring or said second ring an alarm-indication signal at path level.

3. A multiplexed-communications network in accordance with claim 1, each of said first set of nodes further including, in association with said one receiver-transmitter pair, means for controlling said means for adding and said means for dropping subrate channels and integrity-data signals.

4. A multiplexed-communications network in accordance with claim 1, each node of said second set and said third set further including, in association with each of said two receiver-transmitter pairs, means for controlling said means for adding and said means for dropping subrate channels and integrity-data signals.

5. A multiplexed-communications network in accordance with claim 4 in which a first one of said controlling means is connected in tandem with the first of said two receiver-transmitter pairs and with said first ring and in which a second one of said controlling means is connected in tandem with the second of said two receiver-transmitter pairs and with said second ring.

6. A multiplexed-communications network in accordance with claim 1 in which, for nodes of said first set, said means for passing through the node subrate channels and integrity-data signals from receiver to transmitter on said ring passes line remote-defect-indicator signals.

7. A multiplexed-communications network in accordance with claim 1 in which each node of said first set, upon receiving from the ring to which it is connected a line-level loss-of-signal, loss-of-frame, or alarm-indication signal, generates and transmits on said ring an alarm-indication signal at line level.

8. A multiplexed-communications network in accordance with claim 1 in which at least one of said first ring and said second ring is formed from optical fiber.

9. A multiplexed-communications network in accordance with claim 1 in which the transmitter of at least one receiver-transmitter pair includes a laser.

10. A multiplexed-communications network in accordance with claim 1 in which the receiver of at least one receiver-transmitter pair includes an optical-frequency detector.

11. A multiplexed-communications network for connection through an interface to utilization equipment, said network comprising:

(a) a first ring adapted to transport multiplexed subrate channels and integrity-data signals around said first ring in a first direction, (b) a second ring associated with said first ring and adapted to transport multiplexed subrate channels and integrity-data signals around said second ring in a second direction which is opposite to said first direction, and (c) a plurality of nodes each of which is connected in series with at least one of said first ring and said second ring, each of said nodes having:

(1) at least one receiver-transmitter pair for receiving from said first ring or said second ring and transmitting on said first ring or said second ring said multiplexed subrate channels and integrity-data signals, (2) means for adding, by multiplexing, subrate channels and integrity-data signals onto said first ring or said second ring, (3) means for dropping, by demultiplexing, subrate channels and integrity-data signals from said first ring or said second ring, (4) means for passing through the node subrate channels and integrity-data signals from receiver to transmitter on said first ring or said second ring, and (5) means for delivering predetermined demultiplexed subrate channels to said interface, (d) said network being adapted to provide a first class of service in which multiplexed subrate channels transported between nodes of said network are protected against communications errors attributable to faults in said network and, simultaneously, a second class of service in which multiplexed subrate channels are not so protected against errors, and (e) each of said plurality of nodes being selected from:

(1) a first set of nodes each of which has one receiver-transmitter pair and is connected in series with only one of said first ring and said second ring to provide said second class of service for all subrate channels added or dropped at said node, (2) a second set of nodes each of which has two receiver-transmitter pairs and is connected in series with each of said first ring and said second ring, and which duplicates each subrate channel added to the multiplex at said node and multiplexes a first such duplicate subrate channel onto said first ring and a second such duplicate subrate channel onto second ring and simultaneously compares the respective integrity-data signals associated with pairs of demultiplexed subrate channels derived by said receivers from said first ring and said second ring and selects the demultiplexed subrate channel associated with the better integrity-data signal whereby to provide said first class of service for all subrate channels added or dropped at said node, and (3) a third set of nodes each of which has two receiver-transmitter pairs and is connected in series with each of said first ring and said second ring, and which provides said second class of service for all subrate channels added or dropped at said node without association with integrity-data signals and which, further, duplicates each subrate channel added to the multiplex at said node and multiplexes a first such duplicate subrate channel onto said first ring and a second such duplicate subrate channel onto said second ring and simultaneously compares the respective integrity-data signals associated with pairs of demultiplexed subrate channels derived by said receivers from said first ring and said second ring and selects the demultiplexed subrate channel associated with the better integrity-data signal whereby to provide said first class of service for predetermined subrate channels added or dropped in pairs at said node.

\* \* \* \* \*